United States Patent
Schwartz et al.

(10) Patent No.: US 10,140,499 B1
(45) Date of Patent: Nov. 27, 2018

(54) SYSTEMS AND METHODS FOR TOUCH AND PRESS DETECTION USING A SENSOR

(71) Applicant: Synaptics Incorporated, San Jose, CA (US)

(72) Inventors: Adam Schwartz, San Jose, CA (US); Tom Vandermeijden, San Jose, CA (US); Igor Polishchuk, San Jose, CA (US); Michael Cornstock, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 22 days.

(21) Appl. No.: 15/605,526

(22) Filed: May 25, 2017

(51) Int. Cl.
*G06K 9/00* (2006.01)
*G06F 3/0354* (2013.01)
*G06K 9/20* (2006.01)
*G06F 3/0488* (2013.01)

(52) U.S. Cl.
CPC ..... *G06K 9/00013* (2013.01); *G06F 3/03547* (2013.01); *G06F 3/0488* (2013.01); *G06K 9/0002* (2013.01); *G06K 9/20* (2013.01); *G06F 2203/0338* (2013.01); *G06F 2203/04105* (2013.01); *G06F 2203/04808* (2013.01)

(58) Field of Classification Search
CPC .......... G06F 3/0488; G06F 3/044; G06F 2203/04808; G06F 3/03547; G06F 3/041; G06F 2203/0338; G06F 2203/04105; G06K 9/0002; G06K 9/00026; G06K 9/00013; G06K 9/20; G06K 9/00067
See application file for complete search history.

(56) References Cited

U.S. PATENT DOCUMENTS

| | | | |
|---|---|---|---|
| 4,728,186 A | 3/1988 | Eguchi et al. | |
| 5,488,204 A * | 1/1996 | Mead | G06F 3/041 178/18.06 |
| 5,543,590 A * | 8/1996 | Gillespie | G06F 3/041 178/18.06 |
| 5,543,591 A * | 8/1996 | Gillespie | G06F 3/038 178/18.03 |
| 6,408,087 B1 * | 6/2002 | Kramer | G06F 3/03547 345/156 |
| 7,280,679 B2 | 10/2007 | Russo | |
| 7,474,772 B2 * | 1/2009 | Russo | G06F 3/033 345/157 |

(Continued)

*Primary Examiner* — Manav Seth
(74) *Attorney, Agent, or Firm* — Leydig, Voit & Mayer, Ltd.

(57) ABSTRACT

Disclosed are systems and methods for detecting a finger touch and/or finger press. A method includes: detecting presence of a finger on a fingerprint sensor; causing the fingerprint sensor to take measurements using multiple successive frames of the fingerprint sensor; for each measurement, computing a metric associated with the measurement at a given frame corresponding to the measurement; at a first particular frame, determining that the finger has settled on the fingerprint sensor, wherein determining that the finger has settled comprises determining that the metric at the first particular frame exceeds a settled value threshold; and, based on determining that the finger has settled, determining that a finger touch has occurred. A finger press can be further determined by monitoring whether the metric passes a press threshold.

24 Claims, 9 Drawing Sheets

(56) References Cited

U.S. PATENT DOCUMENTS

| | | | | |
|---|---|---|---|---|
| 7,589,709 B2* | 9/2009 | Liess | ............... | G06F 3/0421 |
| | | | | 345/157 |
| 8,111,243 B2* | 2/2012 | Peng | ............... | G06F 3/044 |
| | | | | 345/173 |
| 8,164,573 B2* | 4/2012 | DaCosta | ............... | G06F 3/0418 |
| | | | | 178/18.01 |
| 8,384,683 B2* | 2/2013 | Luo | ............... | G06F 1/1626 |
| | | | | 345/158 |
| 8,493,384 B1* | 7/2013 | Reisman | ............... | G06F 3/0425 |
| | | | | 345/419 |
| 8,610,686 B1* | 12/2013 | Peng | ............... | G06F 3/044 |
| | | | | 345/173 |
| 9,001,040 B2 | 4/2015 | Dean et al. | | |
| 9,639,195 B2* | 5/2017 | Luo | ............... | G06F 3/0414 |
| 2006/0097991 A1* | 5/2006 | Hotelling | ............... | G06F 3/0416 |
| | | | | 345/173 |
| 2014/0337786 A1* | 11/2014 | Luo | ............... | G06F 3/0416 |
| | | | | 715/773 |
| 2015/0084874 A1* | 3/2015 | Cheng | ............... | G06F 3/04883 |
| | | | | 345/173 |

\* cited by examiner

SYSTEMS AND METHODS FOR TOUCH AND PRESS DETECTION USING A SENSOR

FIELD

This disclosure generally relates to biometric sensors and, more particularly, to systems and methods for touch and press detection using a fingerprint sensor.

BACKGROUND

Biometric authentication systems are used for authenticating and/or verifying users of devices incorporating the authentication systems. Biometric sensing technology provides a reliable, non-intrusive way to verify individual identity for recognition purposes.

Fingerprints, like various other biometric characteristics, are based on distinctive personal characteristics and are thus a reliable mechanism for recognizing an individual. There are many potential applications for using fingerprint sensors. For example, fingerprint sensors may be used to provide access control in stationary applications, such as security checkpoints. Electronic fingerprint sensors may also be used to provide access control in mobile devices, such as cell phones, wearable smart devices (e.g., smart watches and activity trackers), tablet computers, personal data assistants (PDAs), navigation devices, and portable gaming devices.

Fingerprint sensors are often incorporated into consumer devices, such as mobile devices. In some cases, the fingerprint sensor is integrated with a "home" button on a cell phone. The home button is commonly a mechanical button. A user can apply force to the home button to press or click on the home button to actuate various features of the cell phone, such as returning to a home screen. In situations where a fingerprint sensor is integrated with the home button, the user can "touch" (as opposed to a press or click) on the home button to perform fingerprint authentication, for example, in response to a request from the cell phone operating system or an application running on the cell phone.

Increasingly, however, the trend in mobile devices is to eliminate the home button or eliminate a mechanical switch from the home button to lower cost and/or thickness.

SUMMARY

One embodiment provides a device comprising a fingerprint sensor and a processing system. The processing system is configured to: detect presence of a finger on the fingerprint sensor; cause the fingerprint sensor to take a plurality of measurements using multiple successive frames of the fingerprint sensor; for each measurement in the plurality of measurements, compute a metric associated with the measurement at a given frame corresponding to the measurement; at a first particular frame, determine that the finger has settled on the fingerprint sensor based on the metric at the first particular frame; and, based on determining that the finger has settled, determine that a finger touch has occurred. In some embodiments, a finger press can be further determined by monitoring whether the metric passes a press threshold.

Another embodiment provides a method for performing touch and/or press detection, comprising: detecting, by a processor, presence of a finger on a fingerprint sensor; causing the fingerprint sensor to take a plurality of measurements using multiple successive frames of the fingerprint sensor; for each measurement in the plurality of measurements, computing, by the processor, a metric associated with the measurement at a given frame corresponding to the measurement; at a first particular frame, determining, by the processor, that the finger has settled on the fingerprint sensor, wherein determining that the finger has settled comprises determining that the metric at the first particular frame exceeds a settled value threshold; and, based on determining that the finger has settled, determining, by the processor, that a finger touch has occurred. In further embodiments, based on determining that the metric exceeds a second threshold (which may be based on a value of the metric when the finger has settled), the method further includes determining that a finger press has occurred.

Some embodiments further include a non-transitory computer-readable storage medium storing instructions that, when executed by a processor, perform the method for touch and/or press detection.

DETAILED DESCRIPTION

Figure 1:
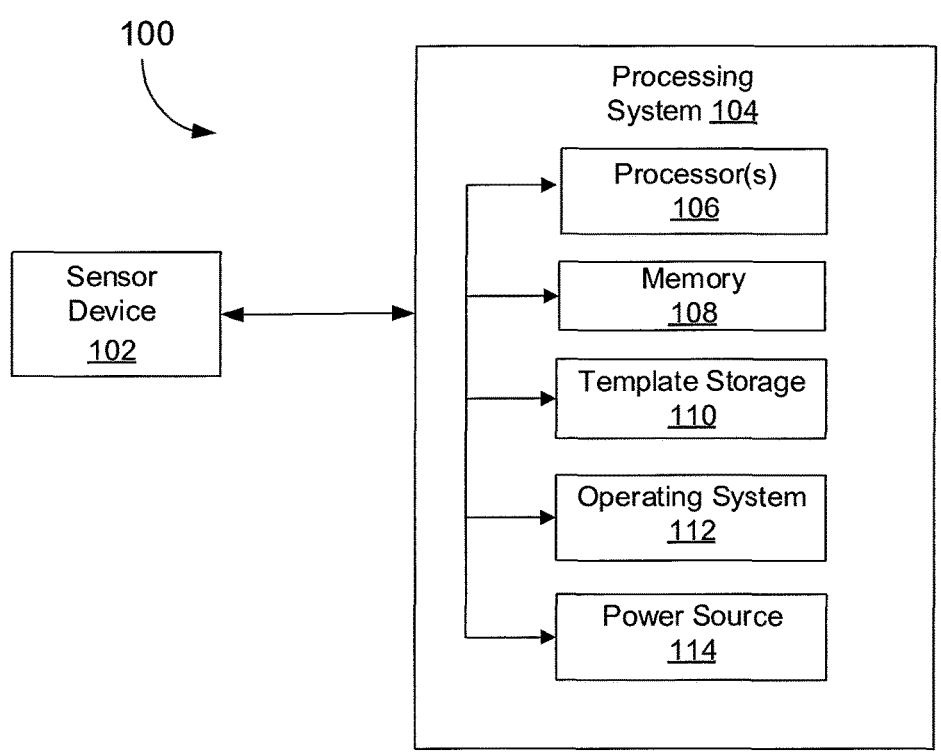
FIG. 1 is a block diagram of an example of a device that includes a sensor and a processing system, according to an embodiment.

The following detailed description is merely exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description. Turning to the drawings, and as described in greater detail herein, embodiments provide systems and methods for touch and press detection using a sensor.

As described above, the trend in mobile devices is to eliminate the home button or to eliminate a mechanical dome switch under the home button. In implementations that eliminate the home button altogether, a fingerprint sensor can be included within or under the display screen of the mobile device. There is need, therefore, to be able to distinguish between a finger press and a finger touch in the absence of a separate mechanical home button. A touch, as used herein, is an event where a user places an object onto a sensor. For example, a finger touch on a fingerprint sensor is an event where a user places a finger onto the fingerprint sensor to perform an authentication attempt or otherwise use the fingerprint sensor. A press, as used herein, is an event where a user presses an object onto a sensor with more force than a touch. For example, a finger press on a fingerprint sensor is an event where a user presses a finger onto the fingerprint sensor with more force than a finger touch on the fingerprint sensor. In some embodiments, the finger press is enough force to depress a mechanical button (for example, 100-200 units of gram-force).

Current approaches to detecting force to differentiate between a finger touch and a finger press in systems that do not have a separate home button are mechanical in nature. For example, one current solution for detecting force relies on mechanical motion of some part of the device that deforms or moves under pressure. For example, a display screen may be touch-enabled (i.e., a "touch screen"), but may also be able to detect a finger press based on changes in capacitance when the display screen is pressed with enough force to cause the display screen to physically bend or move.

By contrast, embodiments disclosed herein provide a system and method for detecting force using a fingerprint sensor without a need for any mechanical movement of the fingerprint sensor or display screen or any other part of the device. Advantageously, by providing a system and method for detecting force using a fingerprint sensor without a need for any mechanical movement, the disclosed embodiments can involve no moving parts, reduce cost, and increase the durability of the fingerprint sensor (i.e., there are no moving parts to wear out) relative to conventional approaches.

The disclosed embodiments involve detecting the presence of an object (e.g., a finger) on a fingerprint sensor and determining whether a touch or press has occurred. While the sensor does not detect the presence of an object, the device is operating in a low-power and/or low duty-cycle mode during this stage of operation. After the sensor detects the presence of an object, a processor associated with the fingerprint sensor or a host processor associated with the device begins polling for a metric corresponding to a measured response of the sensor to the object at a given frame rate. The frame rate may vary depending on the particular fingerprint sensor. The processor continues to poll until a time when the sensor no longer detects the presence of the object.

After the object is detected, the processor begins calculating a metric from a measurement of the object. The metric may comprise one or more values derived from the measurement. In some embodiments, for a capacitive fingerprint sensor, the metric may be an average capacitance value or a median capacitance value. In other embodiments, a histogram of capacitance values may be generated having a plurality of bins, and the metric may be the bin having the largest count of capacitance values (i.e., a mode capacitance value). In other embodiments such as an optical, acoustic, or thermal fingerprint sensor, the metric may be an average intensity value.

In one embodiment, the metric is computed using all of the pixels of the fingerprint sensor at full resolution of the sensor. In another embodiment, the metric is computed using all of the pixels of the fingerprint sensor at less than the full resolution of the sensor (e.g., by ganging or otherwise grouping together all of the pixels in some fashion for a coarser scan). In other embodiments, the metric may be computed on less than all of the pixels of the fingerprint sensor. For example, the metric may be based on a subset of pixels of the sensor, e.g., by sub-sampling the entire fingerprint sensor area to obtain the subset of pixels. In yet another example, the metric may be computed on a continuous subset of pixels from a pre-determined portion of the sensing area of the sensor (e.g., a subset of pixels in a center region of the sensor). In yet another example, the metric may be computed based on identifying a subset of pixels that are covered by an object at a particular time (e.g., a set of covered pixels associated with a finger touch), and computing the metric based on the identified subset of pixels. Further, in some embodiments, the subset of pixels may be further sub-sampled when computing the metric. In addition, in some embodiments, the subset of pixels on which the metric is computed can change based on whether the processor is determining whether a finger touch has occurred after detecting presence of a finger, or whether the processor is determining whether a finger press has occurred after determining that a finger touch has occurred, as described in greater detail below.

As described, the metric may be computed based on all of the pixels of a sensor or based on a subset of pixels of the sensor that includes less than all of the pixels of the sensor. In one embodiment, all of the pixels of the sensor take a measurement of the object, and a subset of the measurements is used for computing the metric. In another embodiment, not all of the pixels of the sensor take a measurement of the object, e.g., measurements are taken at pixel locations included in the subset of pixels, but not at other areas of the sensor that are not included in the subset of pixels.

In some embodiments, based on the value of the metric, a processor can determine whether the finger has "settled." Settling, as used herein, refers to determining that the finger has stopped moving, i.e., determining a "finger touch" has occurred. In one embodiment, determining that the finger has settled comprises determining that the computed metric has exceeded a settled threshold. According to various embodiments, the settled threshold can be a predetermined threshold or an adaptively computed threshold, as described in greater detail herein.

A finger touch is determined to have occurred when a finger settled criteria is met, e.g., the computed metric has exceeded a settled threshold. After determining that a finger touch has occurred, the processor continues to compute the metric from measurements of the object. After determining a finger touch has occurred, and based on the metric, the disclosed embodiments can further determine whether a finger press has occurred based on determining that the metric has exceeded a press threshold. In some embodiments, the press threshold is set relative to the settled threshold. For example, the press threshold may be associated with a metric value that is lower than the settled threshold (e.g., in transcapacitive sensing, more force corresponds to less detected capacitance). Depending on the implementation, the press threshold may be associated with a metric value that is higher than the settled threshold (e.g., in absolute capacitive sensing, more force corresponds to more detected capacitance). In other embodiments, that the measured signal can increase or decrease depending on the specific implementation is also true for optical, acoustic and thermal fingerprint sensors.

Once the settled threshold and press threshold are determined, the processor monitors the measured metric to determine whether either of the touch threshold or press threshold has been exceeded to determine whether a finger touch or finger press has occurred, respectively. Based on whether a finger touch or finger press has occurred, the processor may cause the device to take some action. Examples include changing the state of a graphical user interface (GUI) of the device, or sending an interrupt to a host operating system (e.g., when detecting a finger press when the device is in locked state). As such, embodiments of the disclosure provide a system and method for detecting force and differentiating between a finger touch and a finger press using a fingerprint sensor without any mechanical movement of the fingerprint sensor or display screen or any other part of the device.

Turning to the figures, FIG. 1 is a block diagram of an example of an electronic device 100 that includes a sensor device 102 and a processing system 104, according to an embodiment. By way of example, basic functional components of the electronic device 100 utilized during capturing, storing, and validating a biometric match attempt are illustrated. The processing system 104 includes a processor(s) 106, a memory 108, a template storage 110, an operating system (OS) 112, and a power source(s) 114. Each of the processor(s) 106, the memory 108, the template storage 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 or instructions stored on template storage 110 to identify a biometric object or determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. The enrollment views can include multiple images of the same finger. Further, the enrollment views can include view of multiple different fingers of the user. More generally, the template storage 110 may be used to store information about an object, such as, for example, metrics used to detect force to distinguish between a finger touch and a finger press, as disclosed herein. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 can also host an operating system (OS) 112. The operating system 112 controls operations of the components of the processing system 104. For example, the operating system 112 facilitates the interaction of the processor(s) 106, memory 108 and template storage 110. The processing system 104, although shown as including a processor 106 and memory 108, may further include a microprocessor, microcontroller and/or dedicated circuitry. In some embodiments, the processing system 104 send a message to the sensor 102 to instruct the sensor 102 to capture an image of an object (e.g., such as for an authentication attempt). Further, in some embodiments when the device 100 is in a sleep mode, the sensor 102 may send an interrupt to the processing system 104 when the sensor detects a press on sensor 102, which cases the device 100 to wake from the sleep mode.

According to various embodiments, the processor(s) 106 implement hardware and/or software to obtain data describing an image of an input object. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification. In one embodiment, the processor(s) 106 comprise one or more dedicated processors associated with the sensor device 102. In other embodiments, the processor(s) 106 comprise one or more host processors associated with the electronic device 100.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well power cords and/or adapters which are in turn connected to electrical power.

Sensor device 102 can be implemented as a physical part of the electronic device 100, or can be physically separate from the electronic device 100. As appropriate, the sensor device 102 may communicate with parts of the electronic device 100 using any one or more of the following: buses, networks, and other wired or wireless interconnections. In some embodiments, sensor device 102 is implemented as a fingerprint sensor to capture a fingerprint image of a user. The sensor device 102 can be incorporated as part of a display, for example, or may be a discrete sensor. In some embodiments, the sensor device 102 may perform capacitive imaging. In various other embodiments, the sensor device 102 can be an optical sensor device, ultrasonic sensor device, or another sensor device that uses some other sensing technology for object imaging, as described in greater detail herein.

The electronic device 100 may utilize any suitable combination of sensor components and sensing technologies to detect user input in a sensing region. Some implementations utilize arrays or other regular or irregular patterns of multiple sensing elements to detect the input. Example sensing techniques that the electronic device 100 may use include capacitive sensing techniques, optical sensing techniques, resistive sensing techniques, thermal sensing techniques, inductive sensing techniques, magnetic sensing techniques, and/or radar sensing techniques.

In one example, the electronic device 100 may use inductive sensing techniques where one or more sensing elements pick up loop currents induced by a resonating coil or pair of coils. Some combination of the magnitude, phase, and frequency of the currents may then be used to determine spatial information corresponding to the input object.

In another example, the electronic device 100 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, thin-film detectors, and other suitable photosensors sensitive to light in wavelength(s) of interest. Active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to scatter and partially transmit across this interface at the region of contact by the input object. An example of this is presence of a finger introduced to an input surface defined by a glass to air interface. The higher refractive index of human skin compared to air causes light incident at the input surface at the critical angle of the interface to air to be partially transmitted across the input interface and scattered by the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In another example, the electronic device 100 may use acoustic sensing techniques where one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and or time delay of the electrical signals may be used to determine spatial information corresponding to the input object.

One exemplary acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or individual elements that both transmit and receive may be used (e.g., ultrasonic transceivers). In one implementation, an acoustic pulse is emitted and reflected at the interface corresponding to the input surface. The acoustic impedance at the interface differs depending on whether a ridge or valley of the finger is in contact with that portion of the input surface, affecting the intensity of the detected waves reflected back from the input surface. In some embodiments, emitted ultrasonic waves are able to penetrate sub-surfaces of the input object, such as dermal layers of a human finger.

In another example, the electronic device 100 may use capacitive techniques where voltage or current is applied to create an electric field. Nearby input objects cause changes in the electric field, and produce detectable changes in capacitive coupling that may be detected as changes in voltage, current, or the like. Sensor electrodes may be utilized as capacitive sensing elements. Arrays or other regular or irregular patterns of capacitive sensing elements may be used to create electric fields. Separate sensor electrodes may be ohmically shorted together to form larger sensing elements.

One example technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

Another example technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Also, sensor electrodes may be dedicated transcapacitance sensing elements or absolute capacitance sensing elements, or may be operated as both transcapacitance and absolute capacitance sensing elements.

Some non-limiting examples of electronic devices 100 include personal computers of all sizes and shapes, such as desktop computers, laptop computers, netbook computers, tablets, web browsers, e-book readers, and personal digital assistants (PDAs). Additional example electronic devices 100 include composite input devices, such as physical keyboards and separate joysticks or key switches. Further example electronic devices 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

As described herein, the disclosed embodiments provide a system and method for detecting force using a fingerprint sensor to differentiate between a finger touch and a finger press, for example without the need for a mechanical button.

Figure 2A:
FIG. 2A is an example of fingerprint image of a finger touch, according to one embodiment.
Figure 2B:
FIG. 2B is an example of fingerprint image of a finger press, according to one embodiment.

FIG. 2A is an example of fingerprint image of a finger touch, according to one embodiment. FIG. 2B is an example of fingerprint image of a finger press, according to one embodiment. Using the example of capacitive sensing, depending on the capacitive sensing method, the overall capacitance can increase or decrease as the finger pressure increases from a finger touch to a finger press. For example, for transcapacitive sensing, the capacitance generally decreases as the finger pressure increases from a finger touch to a finger press; whereas, in absolute capacitive sensing, the capacitance generally increases as the finger pressure increases from a finger touch to a finger press.

Figure 3A:
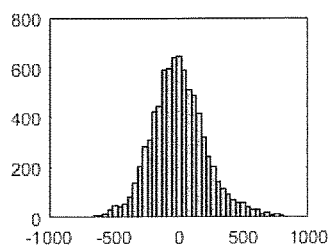
FIG. 3A is an example of a histogram of capacitance values of a fingerprint image associated with a finger touch, according to one embodiment.
Figure 3B:
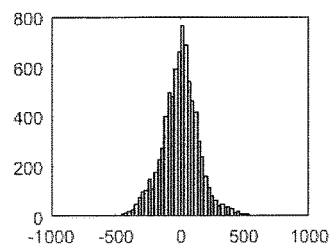
FIG. 3B is an example of a histogram of capacitance values of a fingerprint image associated with a finger press, according to one embodiment.

FIG. 3A is an example of a histogram of capacitance values of a fingerprint image associated with a finger touch, according to one embodiment. FIG. 3B is an example of a histogram of capacitance values of a fingerprint image associated with a finger press, according to one embodiment. Each pixel in a fingerprint image can be associated with a capacitance value relative to baseline value. Initially, when no finger is present, each pixel is associated with no difference relative to the baseline value.

When a finger or other object comes in contact with the sensor, capacitance values of the pixels covered by the finger or other object change relative to the baseline value. The capacitance values of the pixels can be grouped into bins in a histogram, as shown in FIGS. 3A-3B. In FIGS. 3A-3B, the bins of the histogram corresponds to capacitive intensity. As can be seen in FIG. 3A, on a finger touch, the capacitance values form a relatively wider distribution of capacitance values than on a finger press, as shown in FIG. 3B.

Figure 3C:
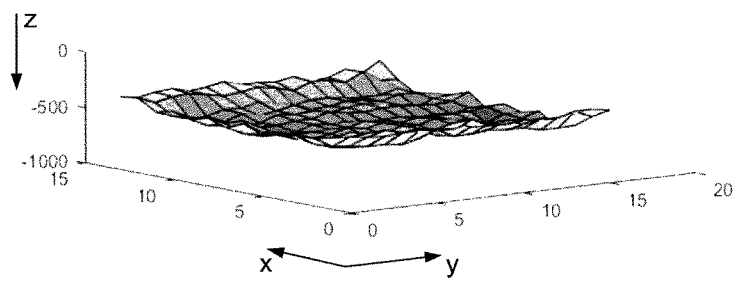
FIG. 3C is a three-dimensional representation of a set of capacitance values associated with pixels corresponding to a finger touch, according to one embodiment.
Figure 3D:
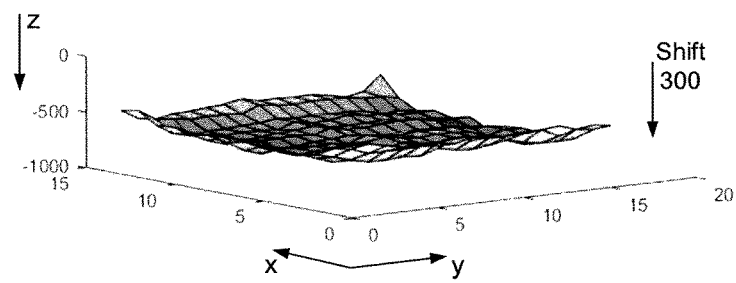
FIG. 3D is a three-dimensional representation of a set of capacitance values associated with pixels corresponding to a finger press, according to one embodiment.

FIG. 3C is a three-dimensional representation of a set of capacitance values associated with pixels corresponding to a finger touch, according to one embodiment. FIG. 3D is a three-dimensional representation of a set of capacitance values associated with pixels corresponding to a finger press, according to one embodiment. In FIGS. 3C-3D, the x-axis and y-axis correspond to a two-dimensional array of pixel locations captured by the fingerprint sensor. The z-axis corresponds to the capacitance value measured at a given pixel location relative to a baseline level (i.e., "0"). As can be seen by comparing the three-dimensional representation in FIG. 3C (i.e., a finger touch) and the three-dimensional representation in FIG. 3D (i.e., a finger press), the distribution of capacitance values is shifted downward 300 in FIG. 3D relative to the distribution of capacitance values in FIG. 3C.

As described in greater detail below, the disclosed embodiments can infer a finger touch and/or a finger press by analyzing changes in a detected metric, such as overall capacitance. In one embodiment, all pixels of the sensor are used to make a finger touch determination. In another embodiment, a subset of the pixels of the sensor (e.g., a sampled subset of all the pixels of the sensor) are used to make a finger touch determination. As such, there are likely to be covered pixels (i.e., pixels of the sensor covered by the finger/object) and non-covered pixels in the subset of pixels while the processor is determining whether a finger touch has occurred.

In one embodiment, all pixels of the sensor (or the subset of the pixels of the sensor) used to identify a finger touch are also used to identify a finger press. In another embodiment, however, once a finger touch is identified, the processor determines a set of covered pixels associated with the finger touch. The set of covered pixels associated with the finger touch can be less than all of the pixels of the sensor (i.e., upon a partial touch on the sensor). The set of covered pixels can then be used as the subset of pixels to compute the metric to detect a finger press, as opposed to all of the pixels of the sensor (or a sampled subset of all of the pixels of the sensor). According to various embodiments, the set of covered pixels associated with the finger touch may comprise: (a) the set of covered pixels in the frame on which the finger touch is detected, (b) the set of covered pixels in a frame shortly after the frame on which the finger touch is detected (e.g., the next frame), or (c) the set of covered pixels in a frame shortly before the frame on which the finger touch is detected (e.g., the preceding frame after the frame on which finger touch is detected), for example. In some embodiments where the set of covered pixels associated with the finger touch is used as the subset of pixels to determine finger press, there are likely to be other covered pixels than those included in the set of covered pixels associated with the finger touch; however, those other covered pixels may be omitted when computing the metric to detect finger press, as described in greater detail below.

In some embodiments, the subset of pixels used for finger touch and/or finger press detection may not provide enough resolution to identify sufficient ridge/valley details to accurately make a fingerprint match or non-match decision; however, an overall shift in capacitance of the subset of pixels as pressure increases from initial finger contact to a finger touch and to a finger press can be determined using embodiments of the disclosure.

Figure 4:
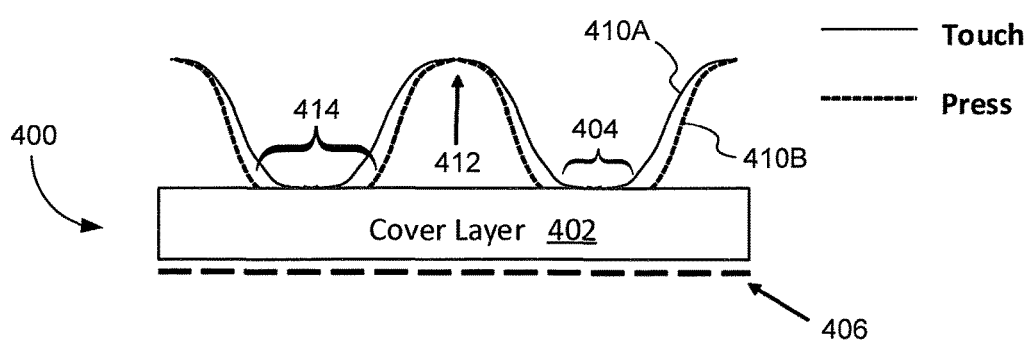
FIG. 4 is a block diagram illustrating a finger being placed on a cover layer of a sensor, according to one embodiment.

FIG. 4 is a block diagram illustrating a finger being placed on a cover layer 402 of a sensor 400, according to one embodiment. The sensor 400, for example a fingerprint sensor, includes sensor pixels 406. The cover layer 402 protects the sensor 400, for example, from damage and water intrusion. The cover layer 402 may be made of glass, plastic, ceramic materials, sapphire, or any other suitable material.

As a finger touch 410A occurs on the cover layer 402, ridges of the finger are in contact 404 with the surface of the cover layer 402. Capacitive fingerprint sensors rely on detecting changes in the capacitance between electrodes of sensor pixels 406 and fingerprint ridges in contact with the surface of the cover layer 402, which are different than the capacitance changes underneath fingerprint valleys 412 that are not in contact with the surface of the cover layer 402. As more pressure is applied (such as when a finger press 410B occurs) on the cover layer 402, the ridges of the finger flatten out and increase their contact area 414 on the surface of the cover layer 402, as shown in FIG. 4. The result of a finger press 410B is a shift in capacitance detected by the sensor pixels 406, as shown in the histograms in FIGS. 3A-3B.

Embodiments of the disclosure can therefore infer force using a fingerprint sensor to differentiate between a finger touch and a finger press based on computing one or more metrics associated with the detected fingerprint. In one example, the metric may be associated with determining an overall capacitance value on a set of pixels, such as computing an average capacitance, determining a median capacitance, identifying a bin of a histogram of capacitance values having the greatest number of pixels, or deriving another statistic from one or more measured capacitance values. In other examples, the metric may be associated with determining an overall optical value, determining an overall grayscale value, such as computing an average grayscale value, determining a median grayscale value, identifying a bin of a histogram of grayscale values having the greatest number of pixels (i.e., a mode grayscale value), or deriving another statistic from one or more measured optical values.

Moreover, in some embodiments, the metric can be computed using pixels comprising less than the full resolution of the sensor. In the example of a capacitive sensor, it is not necessary to analyze the full-resolution fingerprint image to identify a shift in capacitance from a finger touch to a finger press. As such, groups of pixels can be measured together or, alternatively, a subset of pixels can be measured to determine the overall capacitive response. In one embodiment, pixel electrodes can be ganged together such that only a subset of pixel values is measured to sub-sample an image of a fingerprint or a portion of an image of a fingerprint. By using sub-sampling, some embodiments provide that the image can be captured faster and at a lower power consumption than capturing a full resolution image using the entire sensor or a full resolution image using a portion of the entire sensor. Further, in some embodiments, ganging together some of the pixels can provide increased sensitivity when taking the measurement of the given metric. In still further embodiments, the subset of pixels used to compute the metric is based on a set of covered pixels associated with a finger touch.

Figure 5:
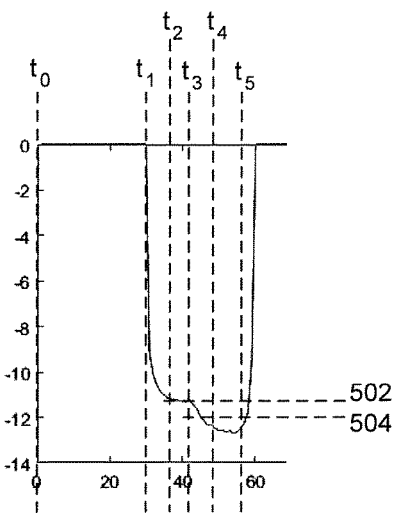
FIG. 5 is a time series diagram illustrating change in average capacitance detected by a fingerprint sensor over time, according to one embodiment.

FIG. 5 is a time series diagram illustrating change in average capacitance detected by a fingerprint sensor over time, according to one embodiment. Time is displayed on the x-axis, and change in average capacitance from a baseline value (i.e., "0") is displayed on the y-axis. In the example in FIG. 5, as a user applies more force, the average capacitance decreases (such as in transcapacitive sensing).

In FIG. 5, the set of pixels used to compute a metric may comprise all of the pixels of the sensor (i.e., full frame resolution) or a sampled subset of all of the pixels of the sensor.

In FIG. 5, at time $t_0$, no finger is detected; thus, the relative average capacitance value (i.e., relative to a baseline value) is 0. At time $t_1$, a finger comes in contact with the sensor and begins to settle. In the example in FIG. 5, as the finger settles, the relative average capacitance value decreases.

At time $t_2$, the finger has settled onto the sensor sufficiently that the relative average capacitance value exceeds a settled value threshold 502. In various embodiments, the settled value threshold 502 can be associated with a predetermined value or can be adaptively determined, as described in greater detail below. In response to the relative average capacitance value exceeding the settled value threshold 502, the system determines that a "finger touch" has occurred.

As further shown in FIG. 5, the user may pause and keep the finger in a finger touch position until time $t_3$, at which time the user begins to apply more pressure to the sensor. The relative average capacitance value further decreases until it exceeds a press threshold 504. In response to the relative average capacitance value exceeding the press threshold 504, the system determines that a "finger press" has occurred. According to various embodiments, the press threshold 504 can be set relative to the settled value threshold 502. For example, press threshold 504 can be set to a value that is lower than the settled value threshold 502 by some ratio (e.g., 8-12% lower). At time $t_4$, the relative average capacitance value passes the press threshold and a finger press is determined. At time $t_5$, the finger is "lifted" from the sensor, and the relative average capacitance value returns back to 0 (i.e., relative to the baseline value).

Figure 6:
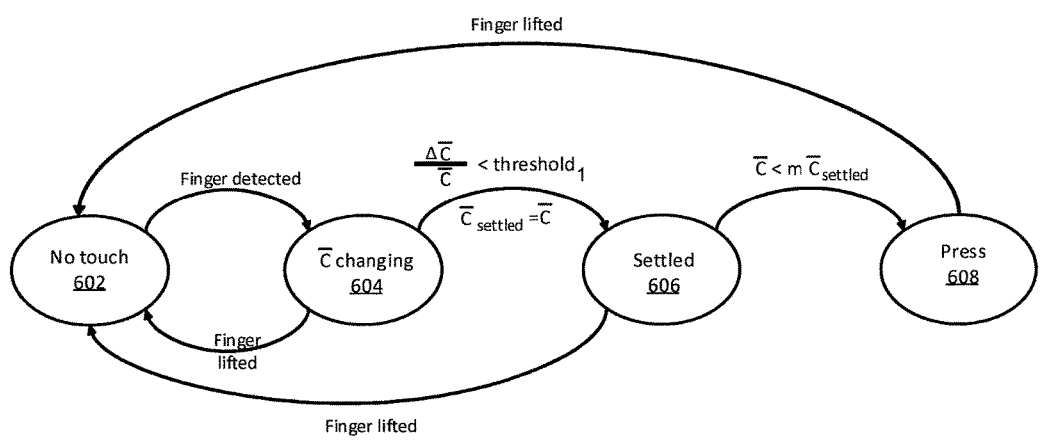
FIG. 6 is a state diagram illustrating adaptively detecting finger touch and finger press by a fingerprint sensor, according to one embodiment.

FIG. 6 is a state diagram illustrating adaptively detecting finger touch and finger press by a fingerprint sensor, according to one embodiment. The state diagram includes four states: no touch state 602, $\overline{C}$ changing state 604, settled state 606, and press state 608. In the embodiment shown in FIG. 6, the settled value threshold and press threshold are adaptively determined. In some cases, the settled value threshold and press threshold can vary based on environmental conditions, finger ridge/valley geometry, the particular sensor being used, and even differences in how a different users touch the sensor. As such, the disclosed embodiments in FIG. 6 provide for adaptively setting the settled value threshold and press threshold.

When no touch is present, the state diagram begins at no touch state 602. In some embodiments, the sensor will be in a low power mode in this state. When presence of a finger is detected by the sensor, the state diagram transitions to the $\overline{C}$ changing state 604. $\overline{C}$ represents a metric detected by the sensor, for example, average capacitance. In $\overline{C}$ changing state 604 (as well as in states 606 and 608), the sensor is actively scanning in order to measure the object and use this measurement to calculate one or more metrics.

If the finger is lifted from the sensor, the state diagram transitions back to no touch state 602 from any other state.

At $\overline{C}$ changing state 604, the metric $\overline{C}$ is determined at each frame at a given frame rate for the sensor. In some embodiment, the frame rate may change depending on the state or other criteria (e.g., different frame rates for one or more of presence detection, settlement detection, and press detection, or different frame rate when using full fingerprint imaging). In one embodiment, the metric $\overline{C}$ is computed using all of the pixels of the sensor at each frame. In another embodiment, the metric $\overline{C}$ is computed using a subset of the pixels of the sensor, such as a sampled subset of pixels. At the $\overline{C}$ changing state 604, as more of the finger is coming into contact with the sensor, a finger contact size that is in contact with the sensor grows from frame to frame, as shown in more detail in FIG. 7 below.

In some embodiments, at the $\overline{C}$ changing state 604, a value $\Delta\overline{C}$ can also be computed as a difference between the metric $\overline{C}$ at a given frame and another frame, e.g., a previous or subsequent frame.

In FIG. 6, the state diagram transitions from the $\overline{C}$ changing state 604 to the settled state 606 in response to determining that one or more settlement criteria have been satisfied. In one embodiment, as shown in FIG. 6, the settlement criteria comprises an adaptively determined settled value threshold $\overline{C}_{settled}$. In the example shown in FIG. 6, a value for $$\frac{\Delta\overline{C}}{\overline{C}}$$

is determined and compared to a first threshold (i.e., threshold$_1$ in FIG. 6). The value for $$\frac{\Delta\overline{C}}{\overline{C}}$$

represents how quickly the metric $\overline{C}$ is changing from frame-to-frame. Once the value of $$\frac{\Delta\overline{C}}{\overline{C}}$$

is less than the first threshold, the system can infer that the finger has settled within a tolerance associated with the first threshold. The settled value threshold $\overline{C}_{settled}$ is then set as the current value of the metric $\overline{C}$, and the state diagram transitions to the settled state 606. Accordingly, in some embodiments, in the settled state 606, a finger touch is determined to be occurring.

In another embodiment, determining that the one or more settlement criteria have been satisfied includes determining that the value $\Delta\overline{C}$ is less than a given threshold (i.e., a so-called "difference threshold"). In yet another embodiment, determining that the one or more settlement criteria have been satisfied includes determining that a sufficient number of pixels of the sensor are covered by the finger (i.e., a so-called "coverage threshold"). In another embodiment, determining that the one or more settlement criteria have been satisfied includes determining that the value $\Delta\overline{C}$ is less than the difference threshold and determining that the number of pixels of the sensor covered by the finger exceeds the coverage threshold.

After the settled value threshold $\overline{C}_{settled}$ has been determined, the press threshold can be computed based on the settled value threshold $\overline{C}_{settled}$. For example, the press threshold can be set to $\overline{C}_{settled}$ multiplied by a constant m. In some embodiments, the press threshold is set to a value that is lower than the settled value threshold $\overline{C}_{settled}$, for example about 8-12% lower than the settled value threshold $\overline{C}_{settled}$ (i.e., m may be about 1.08 to 1.12).

The metric $\overline{C}$ continues to be monitored, and if the value of the metric $\overline{C}$ falls below the press threshold, then the state diagram transitions to the press state 608. Accordingly, in some embodiments, in the press state 608, a finger press is occurring.

It should be noted that references to "less than" certain thresholds in FIG. 6 is just one embodiment (for example, for transcapacitive sensing). In other embodiments, the state diagram may transition between states when the metric $\overline{C}$ is "greater than" certain thresholds, for example when the capacitance increases, rather than decreases, with pressure (such as with absolute capacitance sensing).

In addition, in one embodiment, the metric $\overline{C}$ is computed throughout the state diagram shown in FIG. 6 based on analyzing the same set of pixels (e.g., all of the pixels of the sensor, or a sampled subset of pixels of the sensor). In another embodiment, the metric $\overline{C}$ is computed based on different sets of pixels to transition from different states. In such an embodiment, a first set of pixels (e.g., all of the pixels of the sensor, or a sampled subset of pixels of the sensor) is used to compute the metric $\overline{C}$ when transitioning from the $\overline{C}$ changing state 604 to the settled state 606. Then, a second set of pixels (e.g., a set of covered pixels upon initial transition to the settled state 606) is used to compute the metric $\overline{C}$ when transitioning from the settled state 606 to the press state 608. An example of this embodiment is provided in FIG. 7 below for reference.

Figure 7:
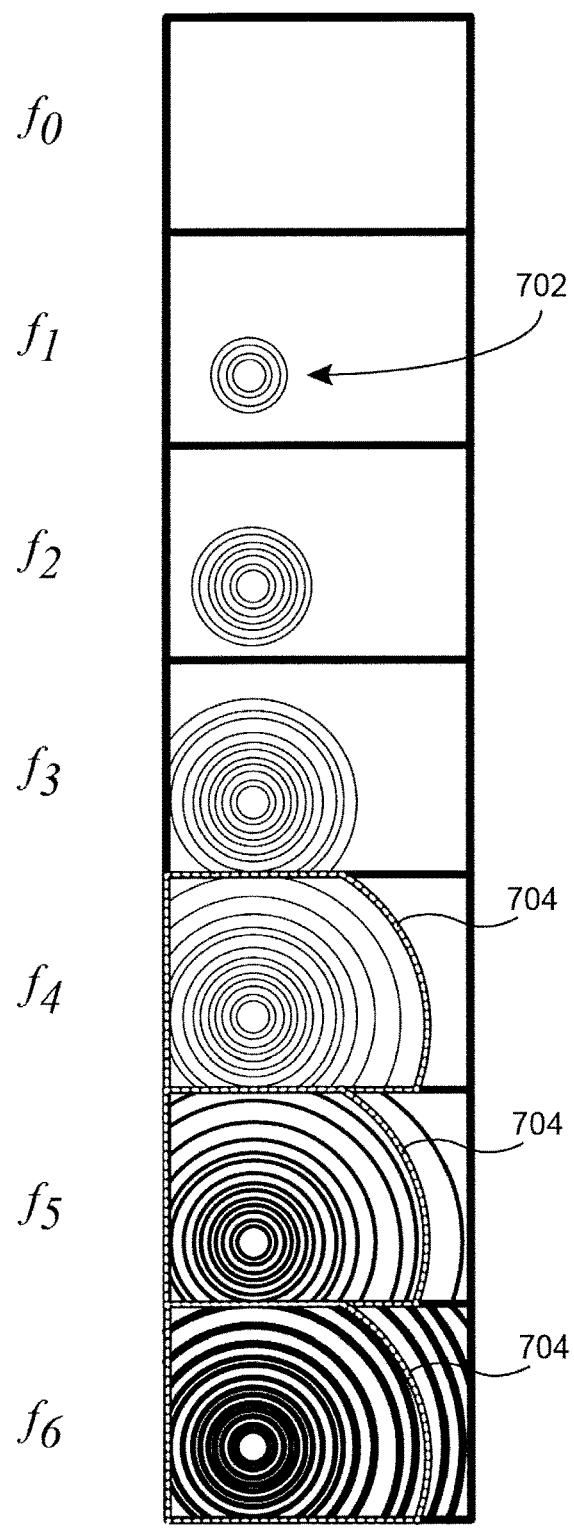
FIG. 7 is a schematic diagram illustrating a finger in contact with a sensor over a series of frames, according to one embodiment.

FIG. 7 is a schematic diagram illustrating a finger in contact with a sensor over a series of frames, according to one embodiment. At frame $f_0$, there is no finger or object in contact with the sensor. At frame $f_1$, a finger comes in contact with the sensor. A set of covered pixels 702 of the sensor that are covered by the finger at frame $f_1$ is shown. As shown in FIG. 7, at frames $f_1$ to $f_4$, more pixels of the sensor are covered by the finger as more of the finger comes in contact with the sensor.

At frame $f_4$, the settlement criteria has been determined to be satisfied. Thus, a finger touch (or "settlement") is detected at frame $f_4$ (i.e., the state transition diagram in FIG. 6 enters the settled state 606). In the example shown, at frame $f_4$ when settlement is detected, the sensor is partially covered by the finger, since less than all of the pixels of the sensor are covered. A set of covered pixels 704 at frame $f_4$ is shown in FIG. 7.

During the "press" period (i.e., frames $f_5$-$f_6$), more pressure is applied and the coverage again increases. Also, the fingerprint ridges flatten out on the sensor, as shown by the thicker lines corresponding to the fingerprint ridges in frames $f_5$-$f_6$. It should be understood, also, that the frames $f_1$-$f_6$ need not be consecutive frames, and additional frames not shown may be present between the frames shown in FIG. 7. At frame $f_6$, the press threshold has been determined to be satisfied, and a finger press is identified. As also shown, at frames $f_5$-$f_6$, the fingerprint ridges compress concurrently with the increasing coverage (i.e., more pixels of the sensor are covered by the finger).

In one embodiment, the set of pixels used to compute the metric for the calculations for finger settlement and finger press detection is the same throughout frames $f_1$-$f_6$ (e.g., all of the pixels of the sensor, or a sampled subset of pixels of the sensor).

In another embodiment, the metric is computed based on different sets of pixels at different stages. For example, a first set of pixels (e.g., all of the pixels of the sensor, or a sampled subset of pixels of the sensor) is used to compute the metric to determine finger settlement (i.e., frames $f_1$-$f_4$). Then, once finger settlement is determined, a second set of pixels is identified and used to determine finger press (i.e., frames $f_5$-$f_6$). For example, a set of covered pixels 704 at frame $f_4$ is used as the second set of pixels. Thus, at frames $f_5$-$f_6$, the set of covered pixels 704 at frame $f_4$ is used to compute the metric, although there are other pixels of the sensor that are covered by the finger in frames $f_5$-$f_6$.

Another embodiment for adaptively determining the settled value threshold and the press threshold is described below in reference to FIGS. 8A-8C. As described, the press threshold can be determined as a scaled amount of a settled value threshold, which represents a finger touch. The embodiment in FIGS. 8A-8C provides a technique for determining the settled value threshold without requiring a pause between a user touching and pressing.

When the sensor first starts detecting the presence of a finger, the sensor begins capturing frames (e.g., images of the finger), as discussed. Upon initial contact, only a portion of the finger contacts the sensor. As the finger settles onto the sensor, the contact area expands. As described in FIG. 5, when the contact area stops expanding and the value of the metric stops changing, the system can infer that the finger has settled. Another embodiment for detecting that the finger has settled is by analyzing the distribution of the pixels values (or a subset of the pixel values), as shown in FIGS. 8A-8C.

Figure 8A:
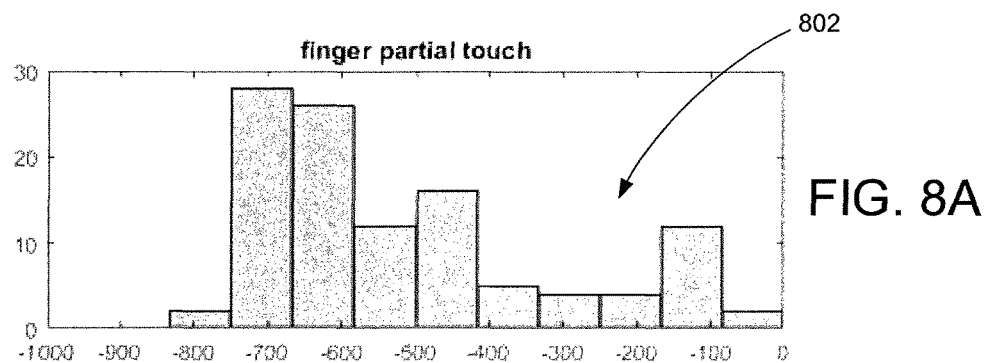
FIGS. 8A-8C illustrate histograms of distributions of pixel values, according to an embodiment.
Figure 8B:
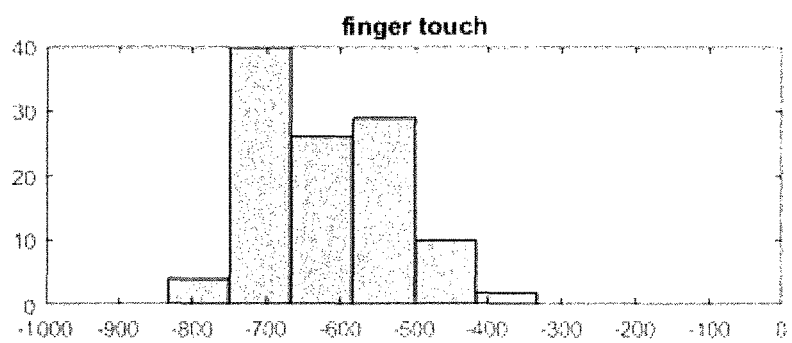
Figure 8C:
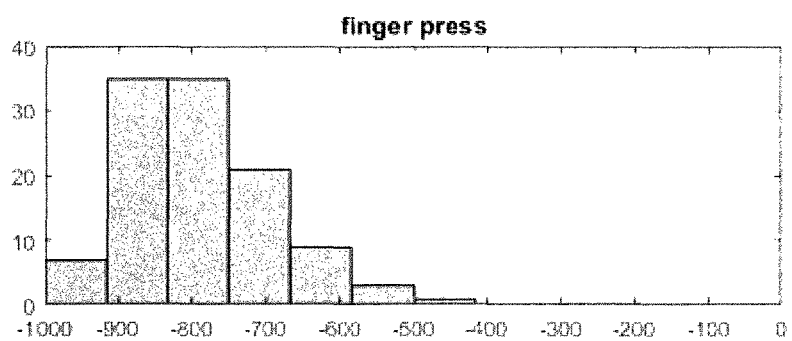

FIGS. 8A-8C illustrate histograms of distributions of pixel values on a partial finger touch (FIG. 8A), when the finger has settled (FIG. 8B), and on a finger press (FIG. 8C), according one embodiment. While the finger is still settling, there is a relatively wide spread of pixel values, as evidenced by the tail 802 of histogram values shown in FIG. 8A. Touched pixels have a certain capacitance (relative to a baseline level of "0"), while untouched or pixels that are starting to get touched have a relatively lower capacitance in the example shown.

Referring to the histograms of distributions of pixel values in FIGS. 8A-8C, certain metrics can be computed from the pixel values in the histogram. For example, a metric associated with the center of the histogram can be computed, such as a mean value, a median value, or a capacitance value of the bin of the histogram having the largest number of pixel values. Also, $\sigma_{spread}$ can be computed that represents a measure of the range of pixel values.

Using the mean value $\mu$ as an example of the metric associated with the center of the histogram, the processor can determine that the finger has settled based on computing whether $\mu$ is greater that k $\sigma_{spread}$, where k is a predetermined constant. In essence, computing that $\mu$>k $\sigma_{spread}$ identifies a point at which enough pixels have clustered together around a center value of the histogram and a tail 802 no longer exists in the distribution. Once $\mu$>k $\sigma_{spread}$, the settled value threshold can be set to the value of $\mu$. The press threshold can be set relative to the settled value threshold. For example, press threshold can be set to a value that is lower than (e.g., 8-12% lower than) the settled value threshold.

Again, referring to FIG. 8A, a portion of the tail of higher values going up to 0 may remain after the finger settles if the finger is not fully covering the sensor. When these tail values become sufficiently stable that can also be an indication of finger settled.

Still further embodiments for adaptively determining the settled value threshold and press threshold can be based on particular use cases. In some embodiments, when a device such as mobile phone is in a sleep mode or a locked state, a user may be required to effectuate a finger press in order wake up and unlock the device. As such, because the system knows that the user is making a finger press, the system can use this information to set the press threshold. Similarly, if the user of the device is interacting with an application on the device, the application may request the user to authenticate with a fingerprint before continuing to use the application. The user would then perform a finger touch to authenticate with the application. The user would likely not perform a finger press in response to a fingerprint authentication attempt, since doing so may exit the application and return the device back to a home screen. As such, because the system knows that the user is making a finger touch in response to the authentication request from the application, the system can use this information to set the settled value threshold (i.e., touch threshold). Once either the press threshold or the touch threshold is determined, the other of the press threshold or the touch threshold can be computed relative to the known threshold. For example, as described, if the touch threshold is known, the press threshold can be set to some value that is lower than (e.g., 8-12% lower than) the touch threshold. Alternatively, if the press threshold is known, the touch threshold can be set to some value that is higher than (e.g., 8-12% higher than) the press threshold.

Figure 9:
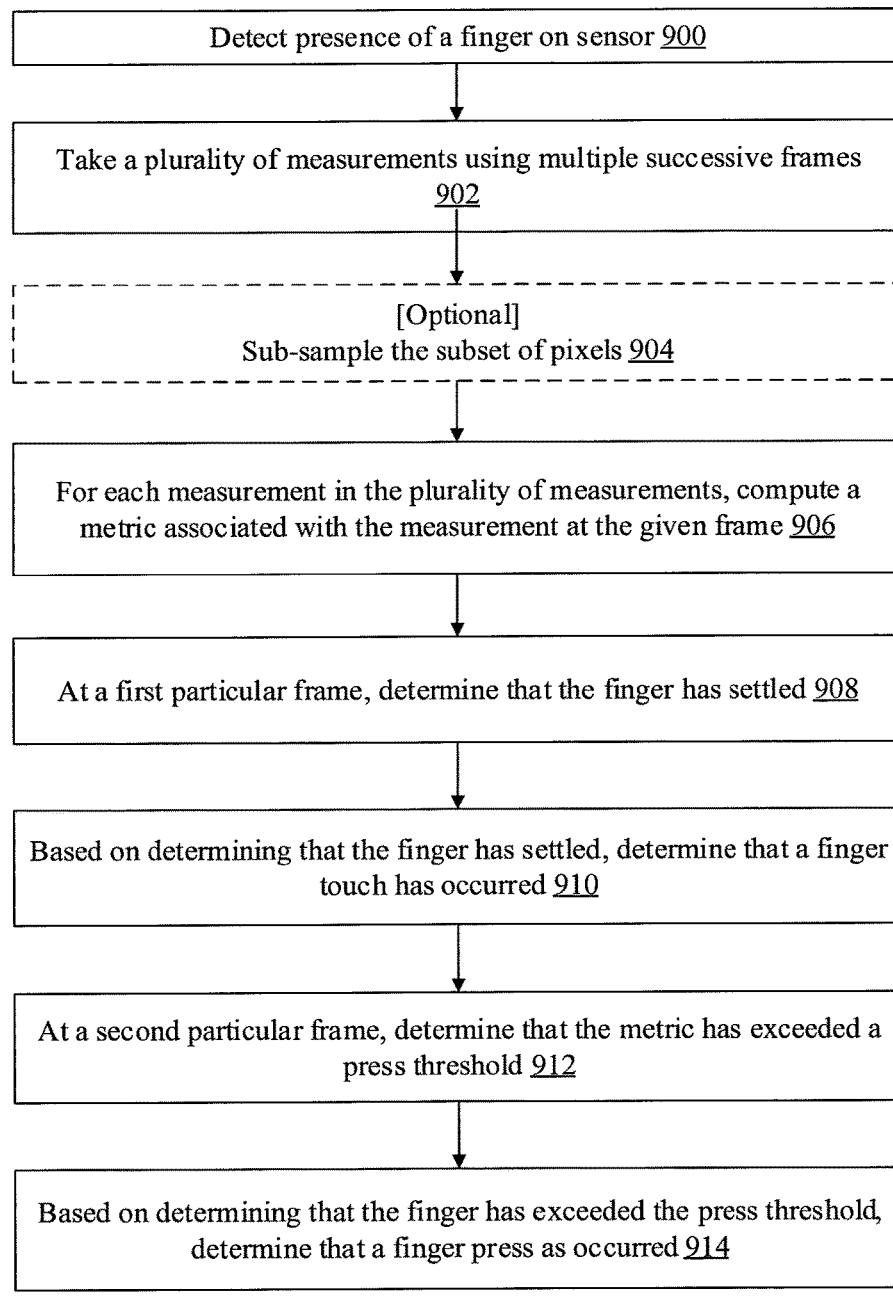
FIG. 9 is a flow diagram illustrating method steps for determining a touch threshold and a press threshold, according to an embodiment.

FIG. 9 is a flow diagram illustrating method steps for determining a touch threshold and a press threshold, according to an embodiment. As shown in FIG. 9, at step 900, a processor detects presence of a finger on a sensor, such as a fingerprint sensor. In one embodiment, the processor is associated with the fingerprint sensor as a dedicated fingerprint processor separate from a host processor of a device, such as mobile device. In other embodiments, the processor of FIG. 9 is the host processor of the device.

At step 902, the processor begins taking a plurality of measurements using multiple successive frames. In one embodiment, measurements are taken at each pixel of the sensor.

Optionally, at step 904, the processor sub-samples the pixels of the sensor. In one embodiment, a pixel value is measured for each pixel of the sensor, and the pixel values is then sub-sampled by the processor. In another embodiment, the sensor is sub-sampled before measurements are captured (e.g., by ganging together pixel electrodes), so that measurements are captured for the sub-sampled pixels of the sensor, but not the non-sub-sampled pixels of the sensor.

At step 906, for each measurement, the processor computes a metric associated with the measurement at the given frame. The processor may continue capturing measurements, and computing associated metrics, until a time when the processor detects that no finger is present. As described herein, in some embodiments involving capacitive sensing, the metric may be associated with determining an overall capacitance value, such as computing and average capacitance, determining a median capacitance, or identifying a bin of a histogram of capacitance values having the greatest number of pixels. In optical sensing systems, the metric may be associated with determining an overall grayscale value, such as computing and average grayscale, determining a median grayscale, or identifying a bin of a histogram of grayscale values having the greatest number of pixels.

At step 908, based on the metric at a first particular frame, the processor determines that the finger has settled. As used herein, the "first particular frame" is any frame of a sequence of frames where a finger is in contract with a sensor, and not necessarily the initial frame in which the finger comes in contact with the sensor. Determining that the finger has settled includes determining that, at the first particular frame, one or more settlement criteria have been satisfied. For example, determining that the finger has settled includes determining that a metric has exceeded a settled value threshold.

As also described, in various embodiments, the settled value threshold may be predetermined or can be adaptively determined. In one embodiment, adaptively determining the settled value threshold may include determining that the metric has stop changing frame-to-frame within a tolerance. In another embodiment, adaptively determining the settled value threshold may include determining that a certain number of pixel values have clustered around a center of a distribution of pixel values.

At step 910, based on determining that the finger has settled, the processor determines that a finger touch has occurred. One or more actions can be performed based on the determination, such as changing the display of a graphical user interface.

At step 912, at a second particular frame, the processor determines that the metric has exceeded a press threshold. As described, the press threshold can be set relative to the settled value threshold. At step 914, based on determining that the finger has exceeded the press threshold, the processor determines that a finger press as occurred. One or more actions can be performed based on the determination, such as sending an interrupt to a host processor that a finger press has occurred or returning a device back to a home screen.

As described above, in one embodiment, the set of pixels used to determine that a finger touch has occurred (i.e., steps 908/910) is the same as the set of pixels used to determine that a finger press has occurred (i.e., steps 912/914). In another embodiment, a first set of pixels is used to determine that a finger touch has occurred (e.g., all pixels of the sensor, or a sub-sampled subset of pixels of the sensor) and a second set of pixels is used to determine that a finger press has occurred (e.g., the set of covered pixels at or around the frame when a finger touch is determined).

Figure 10:
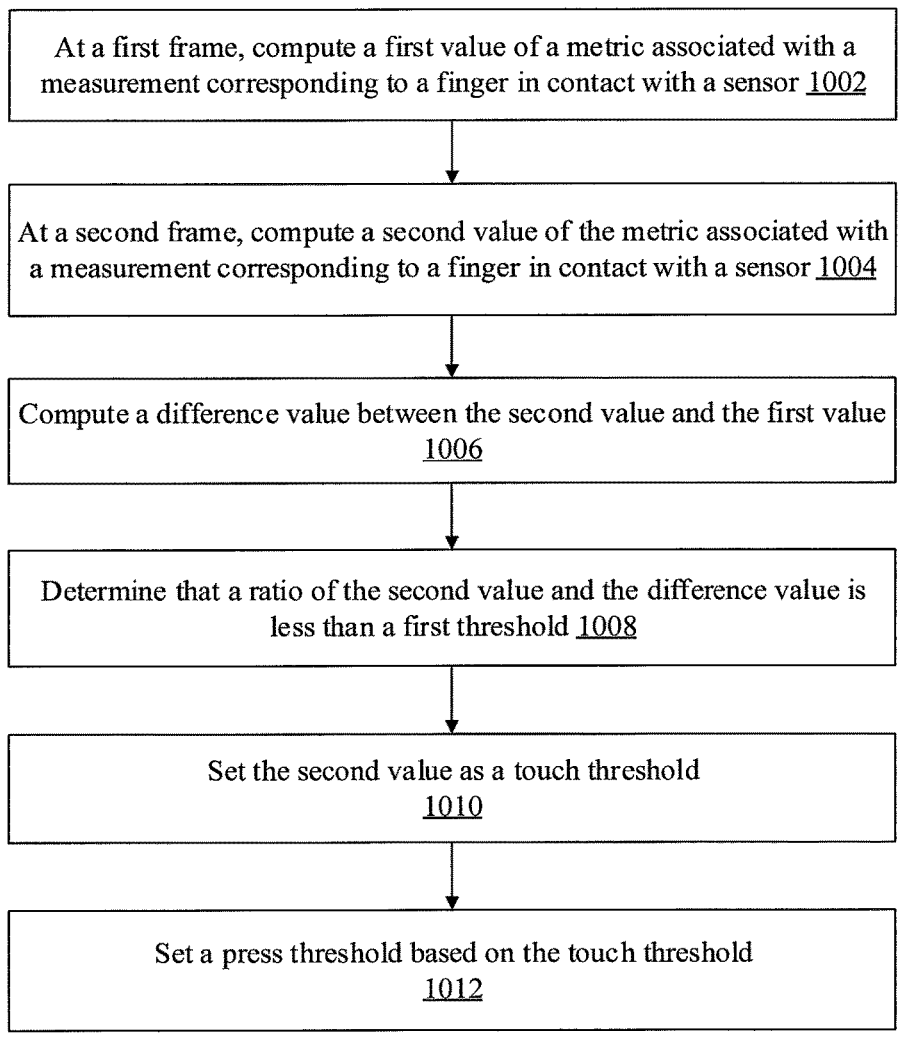
FIG. 10 is a flow diagram illustrating method steps for adaptively setting a touch threshold and a press threshold, according to an embodiment.

FIG. 10 is a flow diagram illustrating method steps for adaptively setting a touch threshold and a press threshold, according to an embodiment. As shown in FIG. 10, at step 1002, at a first frame, a processor computes a first value of a metric associated with a measurement corresponding to a finger in contact with a sensor. At step 1004, at a second frame, the processor computes a second value of the metric associated with a measurement corresponding to a finger in contact with a sensor. For example, the first value and the second values may correspond to an average capacitance value of a subset of pixels at the first frame and the second frame, respectively. In one embodiment, the first frame and the second frame are two consecutive frames. In another embodiment, the first frame and the second frame are not two consecutive frames, and there is at least one frame between the first frame and the second frame.

At step 1006, the processor computes a difference value between the second value and the first value. At step 1008, the processor determines that a ratio of the second value and the difference value is less than a first threshold. In an alternate embodiment, the processor determines that a ratio of the first value and the difference value is less than the first threshold. As described in FIG. 6, determining the ratio of the second value and the difference value comprises determining a value corresponding to how quickly the metric is changing from frame-to-frame. Once the ratio of the second value and the difference value exceeds the first threshold, the processor has determined that the metric is not changing from frame-to-frame within a tolerance.

At step 1010, the processor sets the second value as a touch threshold. In an alternate embodiment, the processor sets the first value as a touch threshold. At step 1012, the processor sets a press threshold based on the touch threshold.

Figure 11:
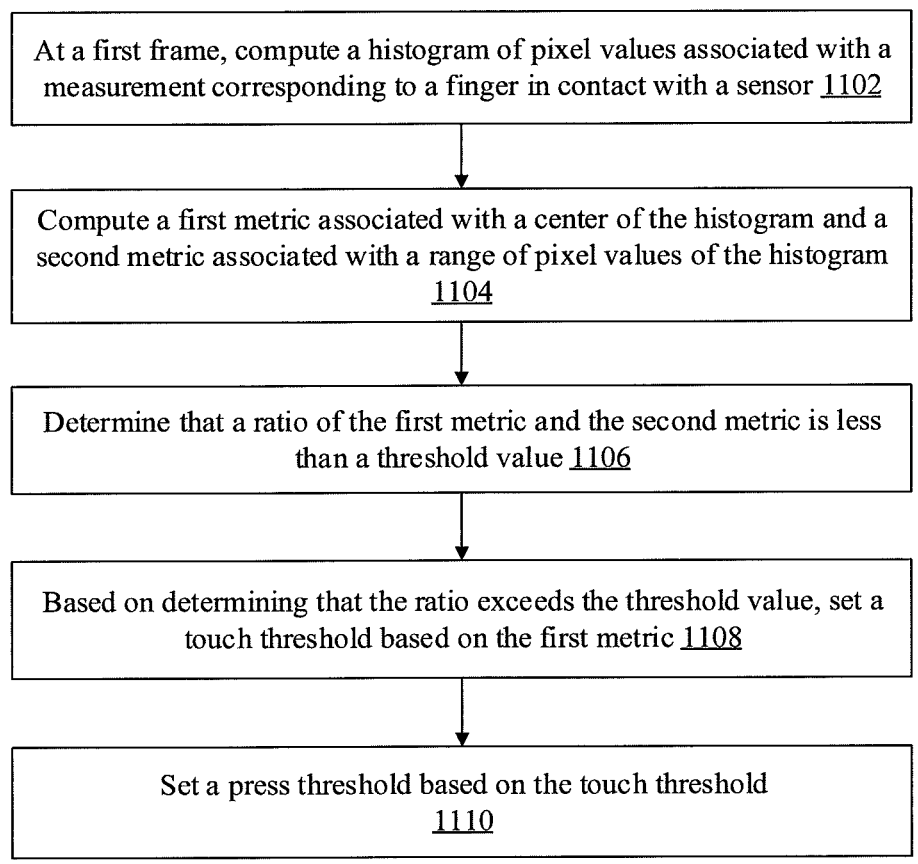
FIG. 11 is a flow diagram illustrating method steps for adaptively setting a touch threshold and a press threshold, according to an embodiment.

FIG. 11 is a flow diagram illustrating method steps for adaptively setting a touch threshold and a press threshold, according to an embodiment. As shown in FIG. 11, at step 1102, at a first frame, a processor computes a histogram of pixel values associated with a measurement corresponding to a finger in contact with a sensor.

At step 1104, the processor computes a first metric associated with a center of the histogram and a second metric associated with a range of pixel values of the histogram. The first metric may be a mean value, a median value, or a value of the bin of the histogram having the largest number of pixel values. The second metric represents a measure of the range of pixel values in the histogram.

At step 1106, the processor determines that a ratio of the first metric and the second metric exceeds a threshold value. In one embodiment, determining that the ratio of the first metric and the second metric is less than a threshold value comprises identifying a point in a sequence of frame at which enough pixels have clustered together around a center value of the histogram within a tolerance, and a tail no longer exists in the distribution.

At step 1108, based on determining that the ratio exceeds the threshold value, the processor sets a touch threshold based on the first metric. For example, the touch threshold may be set as the first metric. At step 1110, the processor sets a press threshold based on the touch threshold.

As described herein, the disclosed embodiments provide systems and methods for determining a finger touch or a finger press using a fingerprint sensor, without the need for a mechanical button. The disclosed embodiments, however, do not rely on fingerprint discrimination to determine a finger touch or a finger press. Therefore, embodiments of the disclosure can also operate when the finger is covered (e.g., the user is wearing gloves). In such a case, as pressure is applied, the glove material compresses against the sensor, causing the finger to come closer to the sensor. This also causes a shift in capacitance that can be detected as a touch or press, as disclosed in the various embodiments described herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments are described herein, although variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device, comprising:
   a fingerprint sensor; and
   a processor configured to:
      detect presence of a finger on the fingerprint sensor;
      cause the fingerprint sensor to take a plurality of measurements using multiple successive frames of the fingerprint sensor;
      for each measurement in the plurality of measurements, compute a metric associated with the measurement at a given frame corresponding to the measurement;
      at a first particular frame, determine that the finger has settled on the fingerprint sensor based on the metric at the first particular frame;
      based on determining that the finger has settled, determine that a finger touch has occurred;
      at a second particular frame, determine that the metric at the second particular frame has exceeded a press threshold; and
      based on determining that the finger has exceeded the press threshold, determine that a finger press has occurred.

2. The device of claim 1, wherein determining that the finger has settled comprises determining that the metric at the first particular frame exceeds a settled value threshold.

3. The device of claim 2, wherein the settled value threshold is predetermined.

4. The device of claim 2, wherein the settled value threshold is adaptively determined.

5. The device of claim 4, wherein adaptively determining the settled value threshold comprises:
   computing a difference value between the metric at two frames;
   determining that a ratio of a value of the metric at one frame of the two frames and the difference value is less than a first threshold; and
   setting a value of the metric at one of the two frames as the settled value threshold.

6. The device of claim 4, wherein adaptively determining the settled value threshold comprises:
   computing a histogram of pixel values associated with a given measurement;
   computing a first metric associated with a center of the histogram and a second metric associated with a range of pixel values of the histogram;
   determining that a ratio of the first metric and the second metric is less than a threshold value; and
   based on determining that the ratio exceeds the threshold value, setting the settled value threshold based on the first metric.

7. The device of claim 4, wherein adaptively determining the settled value threshold comprises:
   determining that, at the first particular frame, a number of pixels of the fingerprint sensor covered by the finger exceeds a coverage threshold; and
   computing a difference value of two values of the metric corresponding to two different frames, and determining that the difference value is less than a difference threshold.

8. The device of claim 1, wherein the fingerprint sensor comprises a capacitive fingerprint sensor, and the metric comprises an average capacitance value, a median capacitance value, or a mode capacitance value.

9. The device of claim 1, wherein the fingerprint sensor comprises an optical fingerprint sensor, and the metric comprises an average grayscale value, a median grayscale value, or a mode grayscale value.

10. The device of claim 1, wherein the press threshold is set based on a value of the metric when the finger has settled on the fingerprint sensor.

11. The device of claim 1, wherein an interrupt is generated based on determining that the finger press has occurred.

12. The device of claim 1, wherein a graphical user interface of the device is changed based on determining that the finger press has occurred.

13. The device of claim 1, wherein the metric at the second particular frame is computed using the same set of pixels of the fingerprint sensor as used to compute the metric at the first particular frame.

14. The device of claim 1, wherein the processor is configured to:
   identify a second set of pixels covered by the finger when the finger has settled on the fingerprint sensor, wherein the metric at the second particular frame is computed using the second set of pixels without using other pixels of the fingerprint sensor not included in the second set of pixels.

15. The device of claim 1, wherein the processor is configured to:
   sub-sample the pixels of the fingerprint sensor, wherein taking the plurality of measurements comprises taking measurements of sub-sampled pixels of the fingerprint sensor.

16. A method for performing press detection, comprising:
   detecting, by a processor, presence of a finger on a fingerprint sensor;
   causing the fingerprint sensor to take a plurality of measurements using multiple successive frames of the fingerprint sensor;
   for each measurement in the plurality of measurements, computing, by the processor, a metric associated with the measurement at a given frame corresponding to the measurement;
   at a first particular frame, determining, by the processor, that the finger has settled on the fingerprint sensor, wherein determining that the finger has settled comprises determining that the metric at the first particular frame exceeds a settled value threshold;
   based on determining that the finger has settled, determining, by the processor, that a finger touch has occurred;
   at a second particular frame, determine that the metric at the second particular frame has exceeded a press threshold; and
   based on determining that the finger has exceeded the press threshold, determine that a finger press has occurred.

17. The method of claim 16, wherein determining the settled value threshold comprises:

computing a difference value between the metric at two frames;

determining that a ratio of a value of the metric at one frame of the two frames and the difference value is less than a first threshold; and setting a value of the metric at one of the two frames as the settled value threshold.

18. The method of claim 16, wherein determining the settled value threshold comprises:

computing a histogram of pixel values associated with a given measurement;

computing a first metric associated with a center of the histogram and a second metric associated with a range of pixel values of the histogram;

determining that a ratio of the first metric and the second metric is less than a threshold value; and based on determining that the ratio exceeds the threshold value, setting the settled value threshold based on the first metric.

19. The method of claim 16, wherein the press threshold is set based on a value of the metric when the finger has settled on the fingerprint sensor.

20. The method of claim 16, wherein the metric at the second particular frame is computed using the same set of pixels of the fingerprint sensor as used to compute the metric at the first particular frame.

21. The method of claim 16, further comprising:

identifying a second set of pixels covered by the finger when the finger has settled on the fingerprint sensor, wherein the metric at the second particular frame is computed using the second set of pixels without using other pixels of the fingerprint sensor not included in the second set of pixels.

22. A non-transitory computer-readable storage medium storing instructions that, when executed by a processor, causes a computing device to perform press detection, by performing steps comprising:

detecting presence of a finger on a fingerprint sensor;

causing the fingerprint sensor to take a plurality of measurements using multiple successive frames of the fingerprint sensor;

for each measurement in the plurality of measurements, computing a metric associated with the measurement at a given frame corresponding to the measurement;

at a first particular frame, determining that the finger has settled on the fingerprint sensor, wherein determining that the finger has settled comprises determining that the metric at the first particular frame exceeds a settled value threshold;

based on determining that the finger has settled, determining that a finger touch has occurred;

at a second particular frame, determine that the metric at the second particular frame has exceeded a press threshold; and based on determining that the finger has exceeded the press threshold, determine that a finger press has occurred.

23. The computer-readable storage medium of claim 22, wherein the press threshold is set based on a value of the metric when the finger has settled on the fingerprint sensor.

24. The computer-readable storage medium of claim 22, wherein the instructions are further configured to cause the computing device to:

identify a second set of pixels covered by the finger when the finger has settled on the fingerprint sensor, wherein the metric at the second particular frame is computed using the second set of pixels without using other pixels of the fingerprint sensor not included in the second set of pixels.

* * * * *